United States Patent
Kraft et al.

(10) Patent No.: US 9,293,741 B1
(45) Date of Patent: Mar. 22, 2016

(54) MECHANICAL CONDITIONING BY BEAD BLASTING LITHIUM IODINE CELL CASE

(75) Inventors: Glenn J. Kraft, Akron, NY (US); Jacquelyn S. Monrian, Corfu, NY (US)

(73) Assignee: Greatbatch Ltd., Clarence, NY (US)

( * ) Notice: Subject to any disclaimer, the term of this patent is extended or adjusted under 35 U.S.C. 154(b) by 451 days.

(21) Appl. No.: 13/340,217

(22) Filed: Dec. 29, 2011

Related U.S. Application Data

(60) Provisional application No. 61/427,924, filed on Dec. 29, 2010.

(51) Int. Cl.
| | |
|---|---|
| *H01M 2/00* | (2006.01) |
| *H01M 2/02* | (2006.01) |
| *H01M 2/04* | (2006.01) |
| *H01M 2/06* | (2006.01) |
| *H01M 2/08* | (2006.01) |
| *H01M 6/00* | (2006.01) |
| *H01M 6/02* | (2006.01) |

(52) U.S. Cl.
CPC ............ *H01M 2/0202* (2013.01); *H01M 2/026* (2013.01); *H01M 6/00* (2013.01); *H01M 6/005* (2013.01); *H01M 6/02* (2013.01); *H01M 2002/0297* (2013.01)

(58) Field of Classification Search
CPC .............. H01M 2/0202; H01M 2/026; H01M 2002/0297; H01M 6/00; H01M 6/005
USPC ......................................................... 429/163
See application file for complete search history.

(56) References Cited

U.S. PATENT DOCUMENTS

| | | | |
|---|---|---|---|
| 3,601,601 A * | 8/1971 | Eilenberger ................... 362/158 |
| 5,604,055 A * | 2/1997 | Brown et al. .................. 429/176 |
| 5,704,239 A | 1/1998 | Beals et al. |
| 5,773,087 A | 6/1998 | Kashihara et al. |
| 6,150,033 A | 11/2000 | Mosser et al. |
| 6,544,351 B2 | 4/2003 | Wang et al. |
| 6,584,820 B1 | 7/2003 | Benedict et al. |
| 6,866,562 B2 | 3/2005 | Girolamo |
| 7,168,142 B2 | 1/2007 | Nowaczyk |
| 7,815,357 B2 | 10/2010 | Hayashi et al. |
| 2002/0000033 A1 * | 1/2002 | Tajima et al. ................. 29/592.1 |

FOREIGN PATENT DOCUMENTS

JP    58012262 A  *  1/1983

OTHER PUBLICATIONS

Yoshizaki et al., English abstract of JP 58-012262 A, Jan. 1983.*

* cited by examiner

*Primary Examiner* — Sean P Cullen
(74) *Attorney, Agent, or Firm* — Steven W. Winn; Michael F. Scalise

(57) ABSTRACT

Bead blasting the inner, contact surface of an electrochemical cell casing to render the inner surface thereof essentially contamination free and suitable as a current collector, is described. The casing is preferably of stainless steel and houses the alkali metal-halogen couple in a case-positive configuration.

22 Claims, 4 Drawing Sheets

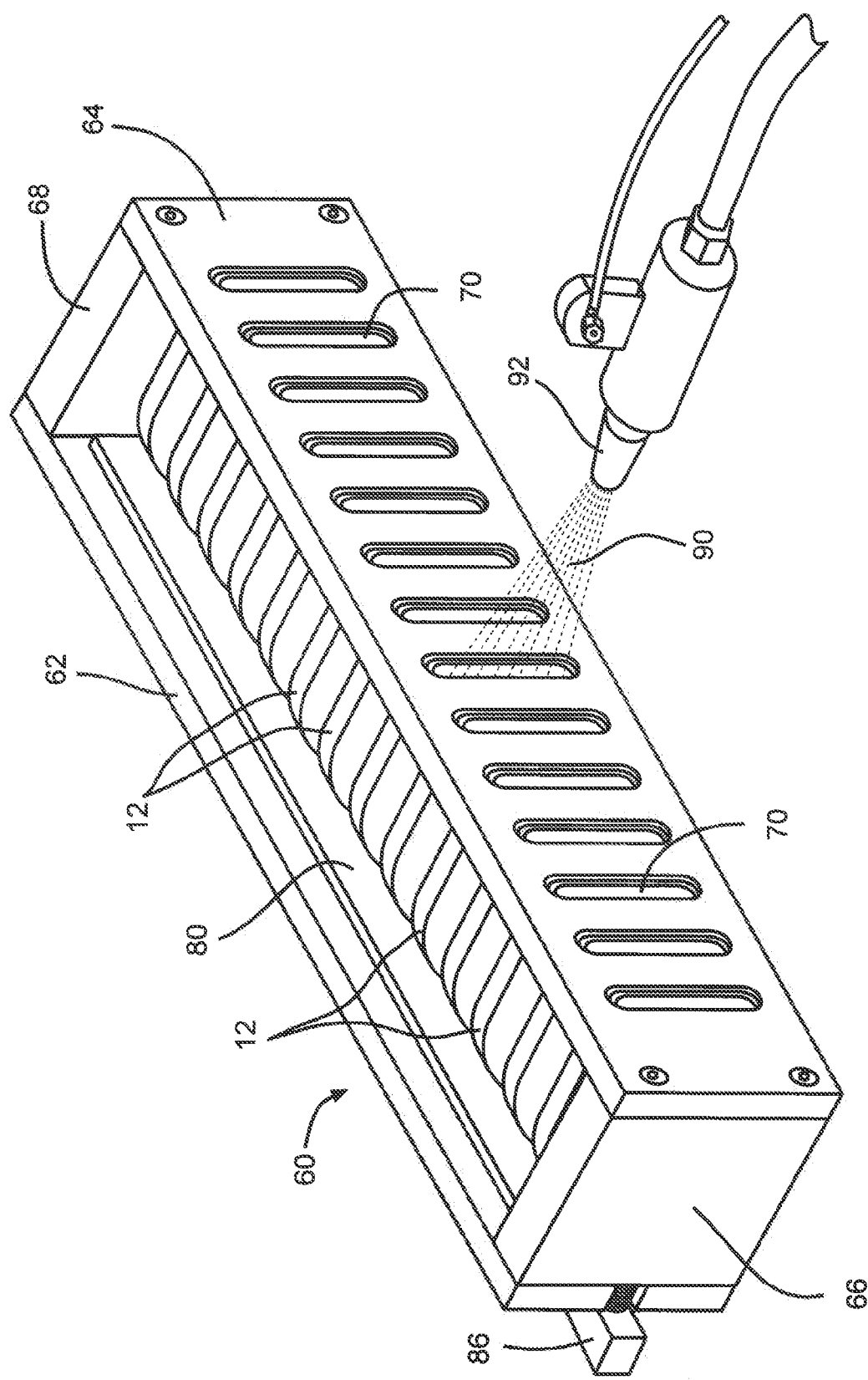

MECHANICAL CONDITIONING BY BEAD BLASTING LITHIUM IODINE CELL CASE

CROSS REFERENCE TO RELATED APPLICATIONS

This application claims priority to U.S. provisional application Ser. No. 61/427,924, filed on Dec. 29, 2010.

BACKGROUND OF THE INVENTION

The present invention generally relates to a solid-state primary cell, and more particularly, to improved discharge performance for alkali metal-halogen cells with simplified methods of making the same. The cells are preferably housed inside of stainless steel cases and the improvements are realized by mechanically conditioning the inside surface of the case according to the present invention prior to introduction of the cell active components.

PRIOR ART

The condition of the internal surface of the stainless steel casings employed in lithium/halogen cells, particularly lithium/iodine cells, has been determined to be critical to cell electrical performance. In many case-positive cell designs, the casing inner surface or wall serves as the cathodic current collector, facilitating electron transfer during discharge. Voltage, impedance and delivered capacity at low current drains can all be adversely affected by contaminants which may be present on casings in their condition as received from suppliers.

Conventional practice in the preparation of the cell casing used in construction of alkali metal-halogen cells is to first acid treat the case to remove surface contamination. One such method of removing surface contamination is by using a chemical etchant. One such chemical etchant is sold under the trade name of Diversey®. These chemical etchants typically comprise a strong acid that reacts with the surface removing a layer of the surface, thereby removing surface contamination thereof.

In such chemical etchant treatments, the stainless steel case for example, is dipped in the chemical etchant. These chemical etchant treatments are generally effective, but it is a time-consuming and increasingly expensive process. Approximately three percent of the weight of each case is removed, dissolved in the acid along with any surface contaminants also present. Thus, bath life becomes limited due to the increasing concentration of metal ions in the costly, strong acid solution with use. As a result, over time, the chemical etchant bath becomes less effective, thereby creating cell case surface conditions that are not uniform. These non-uniform surface condition areas thereby produce electrochemical cells with inconsistent electrical performance, particularly that of output voltage.

In addition, the total chemical etchant process requires two active pretreatment steps, along with copious rinsing and final solvent drying. The acid dipping process is labor-intensive and time consuming. Finally, environmentally sound disposal of the heavy metal-laden spent acid and rinse wastes is becoming prohibitively expensive.

Alternative to chemical etching, electro-polishing methods have also been utilized to remove contamination from the surface of cell cases. In the electro-polishing process, the surface of the cell case is typically subjected to a sequence of pre and post polishing steps. The pre treatment preparation process often comprises a vapor degreasing step, an acid pickling step and a series of rinses. After the surface is subjected to the pre treatment process, the surface is then electro-polished. The electro-polish process generally involves submersion of the surface in an electrically charged acid bath comprised of various acids and electrical parameters. After the surface is electro-polished, the surface is then subjected to a post polishing process typically comprising a series of rinses and drying steps but may also include an additional chemical treatment sequence.

Similar to the chemical etchant process, as described before, electro-polishing is a time-consuming and increasingly expensive process. Like the chemical etchant process, electro-polishing is an extensive and complex process that requires costly equipment and chemicals to perform. In addition, electro-polishing methods are primarily chemical reaction driven processes in which the electro-polishing chemicals become limited due to the increasing concentration of metal ions that accumulate in the acid solution with use. As a result, over time, the electro-polishing bath becomes less effective thereby creating cell case surface conditions that are not uniform and therefore produce cells with inconsistent electrical performance. There is, therefore, a need for a casing, preferably a stainless steel case, for an alkali metal-halogen cell wherein the casing inner surface is essentially free of contaminants to ensure satisfactory electrical performance during discharge. The alkali metal-halogen electrochemical couple is typically constructed in a case-positive configuration with the case wall serving as the cathodic current collector. A contamination free inner surface for the casing facilitates electron transfer during discharge. It would, therefore, be highly desirable to provide the foregoing in a time-saving, economical and environmentally sound manner.

SUMMARY OF THE INVENTION

The present invention is directed to conditioning inner surface of electrochemical cell cases through a bead blasting process. During the bead blasting process, a pressurized stream of discrete beads composed either of metal, ceramic or glass, is directed at a surface of the cell case. The beads impinge the surface, particularly the inner surface, of the electrochemical cell case thereby removing undesirable surface contamination. In addition to removing surface contamination, impingement of the beads on the surface of the case increases the overall surface area of the case surface, thereby increasing the surface area of the current collector of the cell. The bead blasting process is carried out on cell cases in the as-annealed condition received from suppliers without the need for pretreatment of any kind. The cell cases are preferably of stainless steel and are used to construct alkali metal-halogen cells of the central anode, case-positive configuration. The bead blasted cases are ready for cell assembly after a final rinse and cell electrical performance is maintained without the need for wet chemical treatment. A preferred electrochemical system is the lithium-iodine couple.

According to the present invention, the lithium-iodine couple is housed in a bead blast conditioned casing and comprises a lithium anode, a solid-state lithium halide electrolyte, and a solid-state electronically conductive cathode that contains iodine. The anode reaction is:

$$Li \rightarrow Li^+ + e^-$$

and the cathode reaction is:

$$I_2 + 2e^- \rightarrow 2I^-$$

giving an overall reaction of:

$$2Li + I_2 \rightarrow 2LiI$$

This electrochemical system is especially advantageous in that lithium has a high energy density, as the most electropositive metal with the lowest equivalent weight. The electrolyte formed on discharge of the cell is LiI. This lithium salt has the highest ionic conductivity, much higher than the ionic conductivity of divalent halides.

The cathode iodine may be free iodine intimately admixed with a solid electronic conductor or, preferably, it is at least partially chemically bound as in organic-iodine charge transfer complexes. The electrolyte is preferably lithium iodide, which may be formed in situ by contacting the anode and cathode surfaces, whereby lithium reacts with iodine in the cathode to form a solid lithium iodide electrolyte layer contacting the anode and cathode. Alternatively, the electrolyte includes a coating of lithium iodide or other lithium halide on the lithium anode formed by reaction of the lithium with iodine or another halogen. The cathode is contacted against the inner surface of the bead blasted casing, which serves as the cathode current collector.

Lithium-iodine cells fabricated in casings that have been treated according to the present invention have a high operating voltage, typically an open circuit voltage of about 2.7 to 2.8 volts, depending primarily on cell design and the cathode material. Testing has revealed that the prior art processing methods of chemical etching and electro-polishing yield lithium-iodine cells with a more varied voltage output as compared to the method of the present invention. Specifically, test results show that the voltage output of cells produced with the prior art methods can vary as much as 56 millivolts as compared to about 13 millivolts for cells produced with the method of the present invention. This is an improvement of over 75 percent in manufacturing repeatability from cell to cell. This improvement is believed to be attributed to not only the removal of surface contamination and resistive oxide layers, but also to the increased surface area results from the method of the present invention.

Such an improvement in the manufacturing process is beneficial in reducing manufacturing costs. In addition, the improvement in electrical performance of these cells is particularly beneficial in that they are designed to power medical devices that demand exacting electrical performance time after time. Thus, the present invention is an improved manufacturing process for this electrochemical couple that increases electrical performance repeatability without compromising discharge efficiency.

The above aspects of the present invention will become more apparent to those skilled in the art by reference to the following description and to the following drawings.

BRIEF DESCRIPTION OF THE DRAWINGS

FIG. 5 shows a perspective view of an embodiment of the casings 12 being bead blasted according to the method of the present invention.

DETAILED DESCRIPTION OF THE INVENTION

Figure 1:
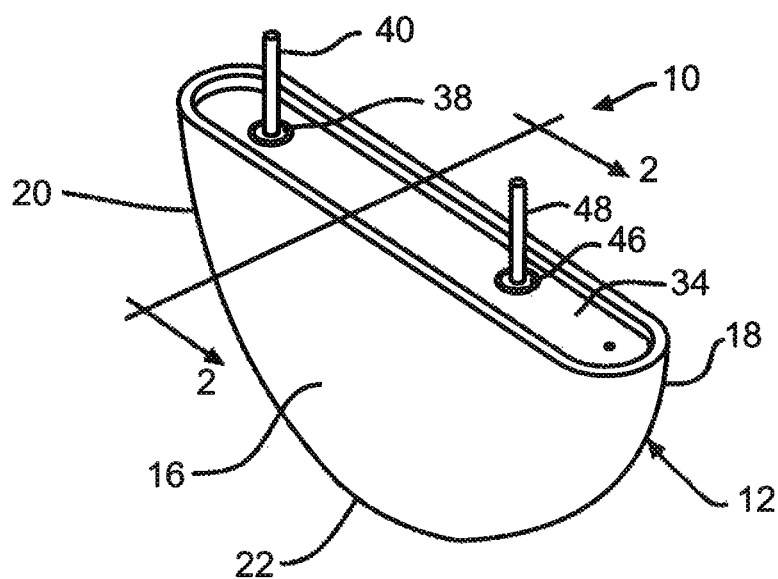
FIG. 1 is a perspective view of an exemplary alkali metal-halogen cell 10 housed in a bead blast conditioned casing 12 according to the present invention.
Figure 2:
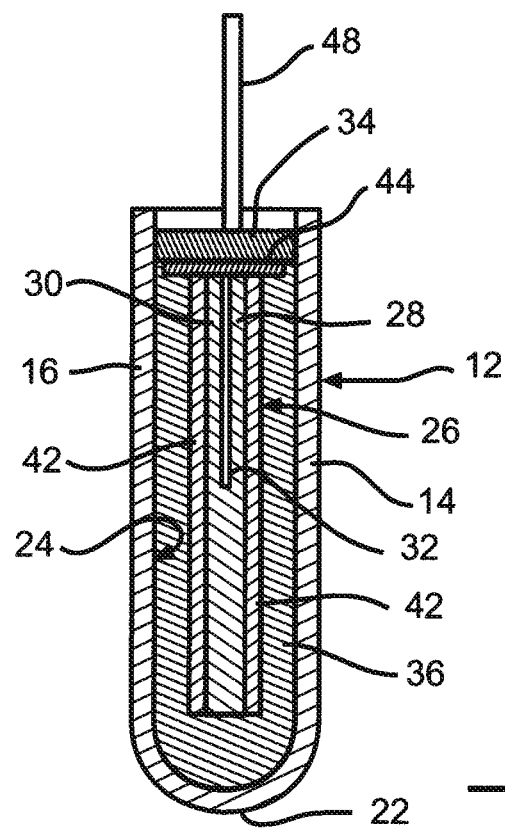
FIG. 2 is an enlarged sectional view taken about on line 2-2 in FIG. 1.

Referring now to FIGS. 1 and 2, there is shown an exemplary alkali metal-halogen electrochemical cell 10 housed inside of a casing 12 in which its surface has been conditioned through a bead blasting treatment according to the present invention. The casing 12 is of a metal such as stainless steel and includes spaced apart sidewalls 14, 16 joined by curved end walls 18, 20 and a curved bottom wall 22. Although stainless steel is the preferred casing material, it is contemplated that other materials such as titanium, mild steel, nickel plated steel, aluminum, or nickel cobalt alloys may be used. In accordance with the present invention, prior to assembly of the cell 10, the casing 12 is bead blasted for a period of time sufficient to render the inner surface 24 of the casing essentially free of contaminants to ensure satisfactory electrical performance of the cell during discharge. According to a preferred aspect of the present invention, the casing 12 is subjected to a pressurized stream of beads for about 2 to about 10 seconds. In a preferred embodiment, a pressure from about 0.34 MPa (50 psi) to about 0.48 MPa (70 psi) may be used. The composition of the beads is non-limiting and may comprise a metal, a ceramic material such as alumina or zirconia, or a glass. In a preferred embodiment, glass beads having a grain size from about 35 μm to about 65 μm, per MIL SPEC "G"—9954A are used during the bead blasting process. The conditioned casing is ready for cell assembly after a final rinse in deionized water.

Figure 3:
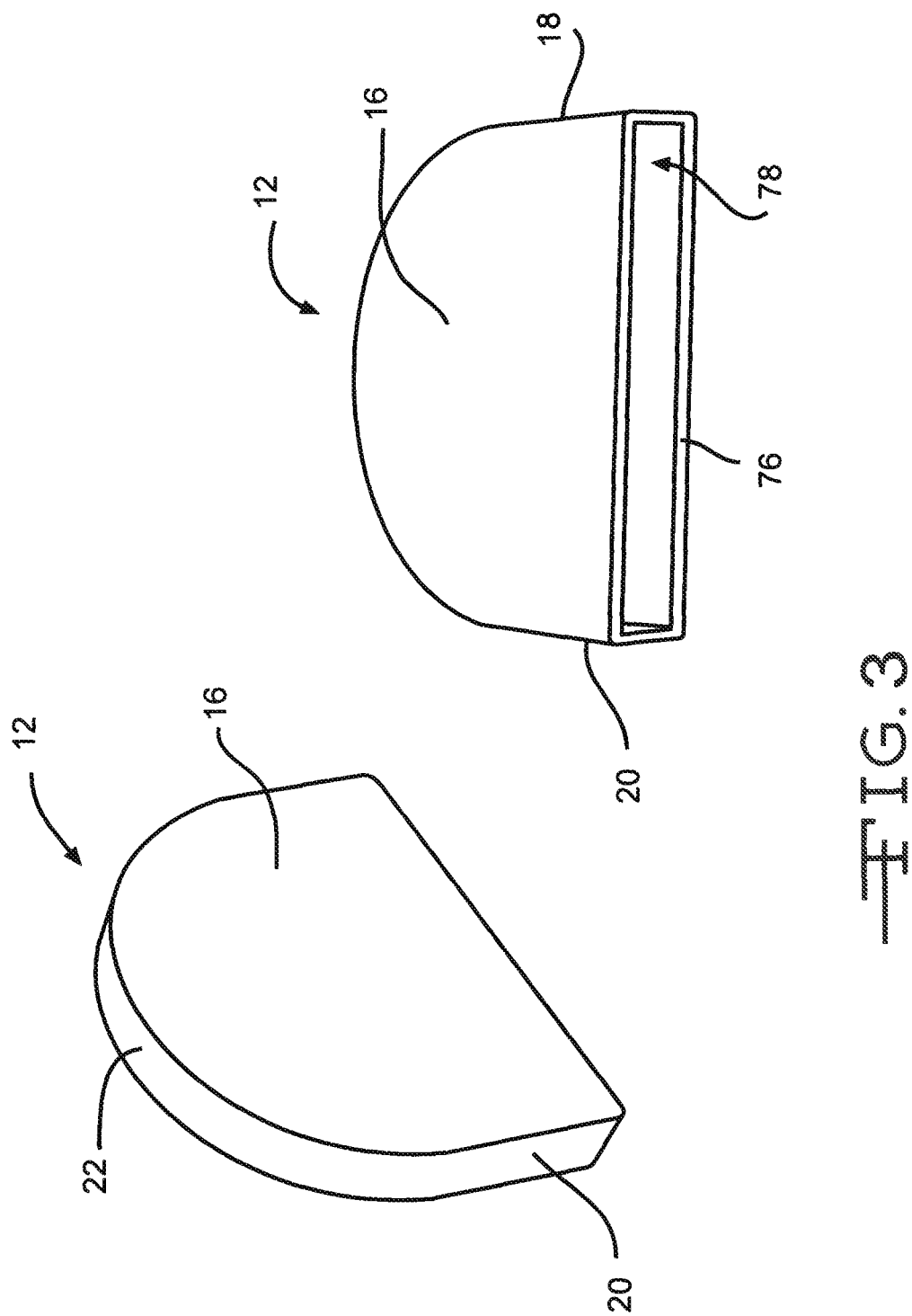
FIG. 3 illustrates a perspective view of an embodiment of casings of the alkali metal-halogen cell 10 in an as received condition.
Figure 4:
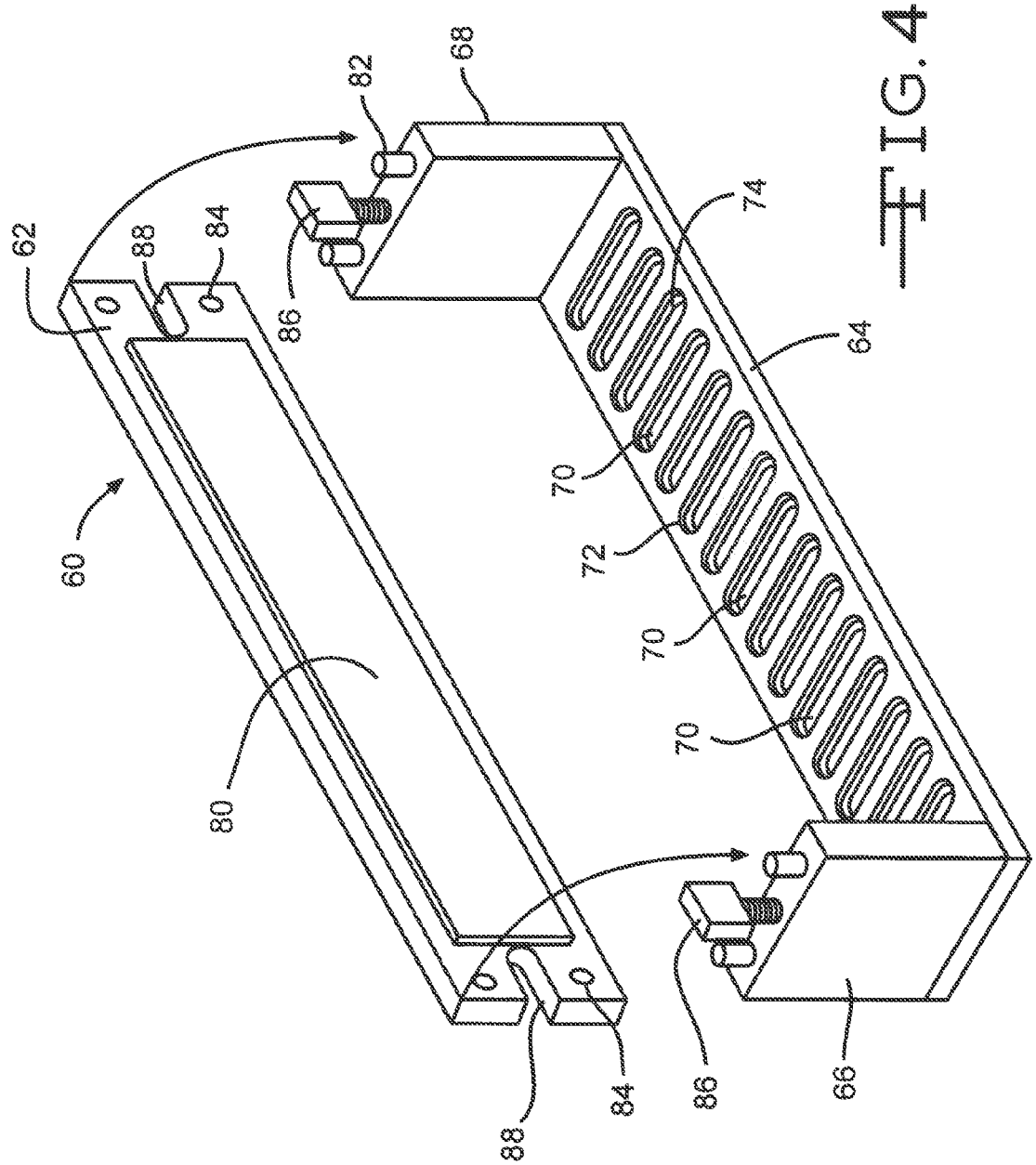
FIG. 4 illustrates a perspective view of an embodiment of a fixture used to hold the casings 12 during the bead blasting process.

As shown in FIG. 3, casings 12, in an as received condition, are positioned in a bead-blasting fixture 60. The fixture 60, as shown in FIG. 4, comprises a fixture lid 62, a fixture base plate 64 and left and right fixture sidewalls 66, 68 positioned therebetween. The fixture sidewalls 66, 68 serve as support structures between the lid 62 and base plate 64.

The fixture base plate 64 comprises a series of openings 70 that extend widthwise along the length of the lid 62. Each of the series of openings 70 extends through the thickness of the base plate 64. Furthermore, each of the openings 70 has a recess 72 with an annular lip 74. The fixture openings 70 are designed such that the annular lip 74 of the openings 70 align with a case rim 76 that surrounds the opening 78 of the cell case 12 (FIG. 3). When the cases 12 are correctly positioned within the fixture 60, as shown in FIG. 5, the fixture openings 70 provide respective passageways that communicate with the case opening 78 to the inner surface 24 of the case 12.

After each of the as received cases 12 is positioned within the fixture 60, the lid 62 is placed across the left and right sidewalls 66, 68, enclosing the cases 12 therewithin. A spacer 80 preferably composed of a soft material such as foam or rubber is attached to the bottom surface of the fixture lid 62. The spacer 80 provides a cushion between the bottom of the fixture lid 62 and curved casing bottom wall 22 and ensures a snug fit therebetween. Alignment pins 82 extend from a top surface of the left and right sidewalls 66, 68. These pins 82 are positioned within lid openings 84. A wing nut 86 is preferably positioned through fixture slot 88 and is secured down within each of the fixture sidewalls 66, 68 enclosing the cases 12 therewithin.

Once the as received cases 12 are secured within the fixture 60, the cases are ready to be bead blasted. As illustrated in FIG. 5, a pressurized stream of beads 90 is directed towards the openings 70 of the fixture 60. The stream of beads 90 exits a bead-blasting nozzle 92 and passes through the fixture opening 70, entering the case opening 78 and contacting the inner surface 24 of the case 12. In a preferred embodiment, the stream of beads 90 impinge the inner surface 24 of the case 12, thereby removing any surface contamination thereof. In addition, bombardment of the beads against the inner surface 24 of the case 12 roughens the surface, thereby increasing its surface area. Therefore, by increasing the surface area of the inner surface 24 of the case 12, the surface area of the cathode current collector of the cell is increased, thus increasing the chemical reaction rate within the cell 10. After about 2 to 5 seconds of exposure, the stream of beads 90 is directed to the next opening 70 and cell case 12. This process is repeated until each of the cell cases 12 within the fixture 60 is conditioned with the pressurized stream of beads 90. After each of the cases 12 has been bead blasted, they are then rinsed and dried.

The electrochemical cell 10 housed inside of the bead blasted casing 12 includes an anode, generally designated 26 and comprising alkali metal, preferably in the form of a pair of lithium plates 28, 30 pressed together and bonded against an anode current collector 32. The anode current collector 32 is a portion of the anode conductor means of the cell. Anode current collector 32 thus is sandwiched between lithium plates 28, 30 and can be of various forms such as a length of wire, a strand or ribbon, or a mesh or screen. Anode current collector 32 is of metal such as nickel or nickel, alloy. Each of the lithium plates 28, 30 in the cell of FIG. 2 has generally planar, oppositely directed parallel surfaces. Lithium plate 28 is identical to lithium plate 30 in size and peripheral outline, the two plates being in registry or in alignment when pressed together. The lithium anode may also be deposited on the anode current collector 32 by vacuum deposition, electroplating or other conventional methods.

The open top of casing 12 housing the anode 26 and anode current collector 32 positioned therein, as shown in FIG. 2, is closed by a lid 34 provided with a fill opening (not shown). Then, the halogen-containing cathode material 36 is introduced into the casing 12 through the fill opening provided in lid 34 such that the cathode material is in operative contact with the anode 26 and with the sides 14,16, bottom 22 and end walls 18, 20 of the conductive metal casing 12, which serves as the cathode current collector. The cathode material 36 preferably comprises a charge transfer complex of an organic material and iodine, although any other cathode active material may be used that is electronically conductive and contains available iodine for the electrochemical reaction.

Charge transfer complexes are a well-known class of materials that have two components, one an electron donor, the other an electron acceptor, that form weakly bonded complexes that exhibit electronic conductivity higher than either component. Suitable charge transfer complexes for this invention consist of an organic donor component and iodine, the electron acceptor, preferably has a conductivity of greater than about $2.5 \times 10^{-4}$ ohm/cm. The charge transfer complexes are in chemical equilibrium with some small amount of free iodine that is available for electrochemical reaction. These charge transfer complexes have a wide range of electronic conductivity. If the conductivity is low, the current output will be comparatively low because of the high internal ohmic resistance. Cathodes containing intimate mixtures of such low conductivity complexes with powdered graphite or inert metal have high conductivities and can provide electrical discharge performance comparable to cells using high conductivity complexes.

In particular, the cathode material 36 is prepared by heating the organic material mixed with iodine to a temperature greater than the crystallization temperature of iodine, for example about 300° F. The amount of iodine should be greater than about 50 percent by weight of the resulting mixture so that enough iodine is available in the cathode material to provide sufficient conductivity for proper cell operation. The resulting mixture is a viscous, flowable substance, which is preferably introduced into the cell casing 12 by flowing it through the above mentioned fill opening in lid 34. When filling is completed, a closure element 38, preferably also of stainless steel, or the like, is welded to the lid 34 in the fill opening and a terminal lead 40 is spot welded to closure, either before or after the closure element 38 is welded to lid 34.

Suitable charge transfer complexes may be prepared using as organic donor components polycyclic aromatic compounds, such as, for example, pyrene, perylene, anthracene, naphthalene, erythrosine, azulene and fluorene; organic polymers, such as, for example, polyethylene, polypropylene, polystyrene, polypyrrole, polyamides and polyvinyls; or heterocyclic compounds, containing nitrogen or sulfur, such as, for example, phenothiazine, phenazine, 10-phenylphenophiozine, thianthrene, 10-methylthiazinc and methalyineblue; and polymerized or polymerizable compounds in which a heterocyclic nitrogen moiety is incorporated as a side chain or substituent, especially vinyl compounds and polymers, such as poly-2-vinyl quinoline, poly-2-vinyl pyridine, poly-4-vinyl pyridine, poly-5-vinyl-2-methyl-pyridine and poly-N-vinyl carbazole. The proportions of iodine to organic component can be varied over a wide range, although a high proportion of uncomplexed iodine in the cathode generally increases internal cell resistance. Other iodine containing cathodes that are electronically conductive may also be used, such as mixtures of iodine and carbon or graphite.

A lithium iodide electrolyte 42 is formed in situ by reaction of the iodine present in the cathode with the lithium anode. It is equally satisfactory, and in some instances preferable, to form a film of lithium salt electrolyte on the anode surface abutting the cathode prior to cell assembly. That's done most conveniently by exposing the anode surface to dry air or argon atmosphere containing halogen gas or vapor. It will be recognized that additional lithium iodide electrolyte is formed by the electrochemical reaction of the cell.

A strip or band of electrical insulating material 44 serves to insulate anode 26 from the metal lid 34 of casing 12 in a completed or assembled cell. An anode lead (not shown) extends from the anode current collector 32 through a glass-to-metal seal serves an insulator and seal structure 46 and becomes an anode terminal lead 46, which extends through lid 34. For a more detailed description of such an alkali metal-halogen cell, reference may be made to U.S. Pat. No. 4,401,736 issued Aug. 30, 1983 entitled "Anode Assembly For Lithium Halogen Cell" and assigned to the assignee of the present invention, the disclosure of which is hereby incorporated by reference.

The above described exemplary alkali metal-halogen electrochemical cell housed in the bead blasted casing according to the present invention performs as well as or better than a comparable cell having a case treated by the more costly acid-cleaning and electro-polishing processes of the prior art.

The following example describes the manner and process of carrying out the present invention in an electrochemical cell, and this example sets forth the best mode contemplated by the inventors of carrying out the invention, but it is not to be construed as limiting.

Example I

Lithium/iodine cells of case-positive configurations similar in construction to the exemplary alkali metal-halide cell 10 just described were used as test vehicles. The cells were constructed to deliver rate capacities of 1.32 Ah. Stainless steel cases were conditioned using the three methods previously discussed, conventional chemical etching, conventional electro-polishing and bead blasting according to the present invention. Three groups of cells were fabricated, group "A" in which the casings were bead blasted according to the present invention, a prior art group "B" in which the casings were electro-polished using a solution of about 20 volume percent perchioric acid and about 80 volume percent acetic acid, and a prior art group "C" in which the casing were treated using Diversey® chemical etchant.

After fabrication, all cells were preconditioned at 37° C. by discharge under 6.98K loads for a period of about 60 hours, followed by placement under 100K loads for about 24 hours. Closed circuit voltage and 1 kHz internal impedance readings were recorded throughout this preconditioning period.

At beginning-of-life, alkali metal-halogen cells typically are characterized by high loaded voltages and low internal impedances. As shown in Table 1, the cells comprising the bead blasted case surface according to the present invention exhibited electrical discharge characteristics equaling or exceeding those of cells housed in acid treated or electro-polished cases.

TABLE I

| S/N | Group | Final 100K loaded voltage, mv | Final 100K loaded impedance, ohms |
|---|---|---|---|
| 711 | A | 2,726 | 86 |
| 712 | | 2,725 | 88 |
| 713 | | 2,726 | 85 |
| 714 | | 2,731 | 82 |
| 715 | | 2,727 | 84 |
| 716 | | 2,725 | 85 |
| 717 | | 2,726 | 90 |
| 718 | | 2,718 | 97 |
| 719 | | 2,719 | 100 |
| 720 | | 2,721 | 95 |
| 721 | | 2,718 | 97 |
| 722 | | 2,722 | 94 |
| 723 | | 2,723 | 91 |
| 724 | | 2,724 | 92 |
| 725 | | 2,727 | 86 |
| 726 | | 2,723 | 93 |
| 727 | | 2,726 | 88 |
| 728 | | 2,726 | 83 |
| 729 | | 2,725 | 89 |
| 730 | | 2,724 | 92 |
| 731 | | 2,726 | 87 |
| 732 | | 2,726 | 90 |
| 733 | | 2,726 | 89 |
| 734 | | 2,719 | 98 |
| 735 | | 2,721 | 96 |
| | | 2,724 +/- 3 | 90 +/- 5 |
| 686 | B | 2,694 | 94 |
| 687 | | 2,708 | 94 |
| 688 | | 2,693 | 96 |
| 689 | | 2,688 | 92 |
| 690 | | 2,698 | 93 |
| 691 | | 2,695 | 100 |
| 692 | | 2,690 | 94 |
| 693 | | 2,685 | 95 |
| 694 | | 2,696 | 102 |
| 695 | | 2,687 | 100 |
| 696 | | 2,700 | 97 |
| 697 | | 2,687 | 102 |
| 698 | | 2,682 | 94 |
| 699 | | 2,699 | 90 |
| 700 | | 2,697 | 89 |
| 701 | | 2,682 | 89 |
| 702 | | 2,679 | 88 |
| 703 | | 2,677 | 92 |
| 704 | | 2,675 | 91 |
| 705 | | 2,678 | 89 |
| 706 | | 2,699 | 92 |
| 707 | | 2,700 | 85 |
| 708 | | 2,704 | 87 |
| 709 | | 2,702 | 89 |
| 710 | | 2,707 | 94 |
| | | 2,692 +/- 10 | 95 +/- 5 |
| 661 | C | 2,687 | 89 |
| 662 | | 2,679 | 93 |
| 663 | | 2,665 | 92 |
| 665 | | 2,694 | 82 |
| 666 | | 2,671 | 84 |
| 667 | | 2,670 | 91 |
| 668 | | 2,669 | 92 |
| 669 | | 2,679 | 87 |
| 670 | | 2,687 | 84 |
| 671 | | 2,657 | 92 |
| 672 | | 2,656 | 87 |
| 673 | | 2,678 | 97 |
| 674 | | 2,658 | 86 |
| 675 | | 2,688 | 94 |
| 676 | | 2,698 | 85 |
| 677 | | 2,661 | 85 |
| 678 | | 2,673 | 87 |
| 679 | | 2,699 | 88 |
| 680 | | 2,684 | 88 |
| 681 | | 2,683 | 90 |
| 682 | | 2,653 | 91 |
| 683 | | 2,671 | 87 |
| 684 | | 2,686 | 85 |
| 685 | | 2,680 | 87 |
| | | 2,676 +/- 13 | 88 +/- 4 |

The bead blasting process of the present invention is seen to have caused the cathodic current collectors, i.e., the inner case surfaces, to perform as effectively as those which have been acid-treated or electro-polished according to the prior art. High loaded cell voltage is maintained and internal impedance is typically lowered for the present invention cells in comparison to those of a comparable chemistry housed in casings having their internal surfaces treated according to the prior art. As illustrated by the data above, the bead blasted cells not only have a greater high loaded cell voltage output averaging about 2,724 my, but also have the lowest standard deviation of about 3 mV, it is, therefore, believed that the case conditioning afforded by the bead blasting method of the present invention improves voltage output performance and manufacturability of alkali metal-halogen electrochemical cells.

It is appreciated that various modifications to the inventive concepts described herein may be apparent to those skilled in the art without departing from the spirit and scope of the present invention defined by the hereinafter appended claims.

What is claimed is:

1. A method of manufacturing an electrochemical cell, comprising the steps of:
   a) providing a casing of an electrically conductive material, wherein the casing has a casing opening providing access to an inner casing surface;
   b) providing a bead blasting fixture;
   c) securing the casing to the bead blasting fixture;
   d) applying a pressurized stream of glass beads through the casing opening to impinge on at least a portion of the inner casing surface, wherein the glass beads have a grain size ranging from about 35 μm to about 60 μm and the pressurized stream is at a pressure greater than 0.0 MPa (0 psi) up to a maximum pressure of about 0.41 MPa (60 psi) to thereby provide a conditioned inner casing surface;
   e) discontinuing application of the pressurized stream of glass beads to the inner casing surface, wherein at least the conditioned inner casing surface is essentially free of contaminants;
   f) providing an anode comprising an anode active material and a cathode comprising a cathode active material and assembling the anode and cathode inside the casing as an electrochemical couple, wherein at least a portion of the cathode active material contacts at least a portion of the conditioned inner casing surface; and g) closing the casing opening to thereby seal the electrochemical couple within the casing.

2. The method of claim 1 including providing the casing comprised of a material selected from the group consisting of stainless steel, titanium, mild steel, nickel plated steel, aluminum, nickel cobalt alloys, and combinations thereof.

3. The method of claim 1 including providing the cathode active material comprised of a charge transfer complex of an organic electron donor material and iodine.

4. The method of claim 1 including providing the cathode active material comprises a halogen containing material.

5. The method of claim 1 including providing the anode active material composed of an alkali metal.

6. The method of claim 1 including applying the pressurized stream of glass beads impinging on the inner casing surface intended to be conditioned for about 2 seconds to about 10 seconds.

7. The method of claim 1 including removing the casing from the bead blasting fixture after discontinuing application of the pressurized stream of glass beads to the inner casing surface.

8. The method of claim 1 including providing an anode conductor supported by a glass-to-metal seal connected to the casing, wherein the anode conductor is operatively connected to the anode and electrically isolated from the casing by the glass-to-metal seal.

9. The method of claim 8 including supporting the glass-to-metal seal in a case lid closing the casing opening.

10. A method of manufacturing an electrochemical cell, comprising the steps of:
a) providing a casing of an electrically conductive material, wherein the casing has a casing opening providing access to an inner casing surface;
b) providing a bead blasting fixture;
c) securing the casing to the bead blasting fixture;
d) applying a pressurized stream of glass beads through the casing opening to impinge on at least a portion of the inner casing surface, wherein the pressurized stream is at a pressure greater than 0.0 MPa (0 psi) up to a maximum pressure of about 0.34 MPa (50 psi) to thereby provide a conditioned inner casing surface;
e) discontinuing application of the pressurized stream of glass beads to the inner casing surface;
f) providing an alkali metal anode and a cathode comprising a halogen-containing cathode material and assembling the anode and the cathode inside the casing as an electrochemical couple, wherein at least a portion of the halogen-containing cathode material contacts at least a portion of the conditioned inner casing surface; and
g) closing the casing opening to thereby seal the electrochemical couple inside the casing.

11. The method of claim 10 including providing the casing comprised of a material selected from the group consisting of stainless steel, titanium, mild steel, nickel plated steel, aluminum, nickel cobalt alloys, and combinations thereof.

12. The method of claim 10 wherein the portion of the halogen-containing cathode material contacting at least a portion of the conditioned inner casing surface is a first portion of the halogen-containing cathode material, and the method including providing a second portion of the halogen-containing cathode material in electrochemical contact with the alkali metal anode so that the first portion of the halogen-containing cathode material in electrically conductive contact with at least a portion of the conditioned inner casing surface serves as a cathode current collector.

13. The method of claim 10 wherein the halogen-containing material is comprised of a charge transfer complex of an organic electron donor material and iodine.

14. The method of claim 10 including applying the pressurized stream of glass beads impinging on the inner casing surface intended to be conditioned for about 2 seconds to about 10 seconds.

15. The method of claim 10 including providing the glass beads having a grain size ranging from about 35 µm to about 60 µm.

16. The method of claim 10 including providing an anode conductor supported by a glass-to-metal seal connected to the casing, wherein the anode conductor is operatively connected to the alkali metal anode and electrically isolated from the casing by the glass-to-metal seal.

17. The method of claim 16 including supporting the glass-to-metal seal in a case lid closing the casing opening.

18. A method of manufacturing an electrochemical cell, comprising the steps of:
a) providing a plurality of casings, each casing having a casing opening providing access to an inner casing surface and being composed of stainless steel;
b) providing a bead blasting fixture comprising a plurality of fixture openings;
c) aligning one of the casing openings with a respective one of the fixture openings so that the aligned casings are supported by the bead blasting fixture;
d) applying a pressurized stream of glass beads through each of the casing openings to impinge on at least a portion of the inner casing surface, thereby providing each casing with a conditioned inner casing surface;
e) discontinuing application of the pressurized stream of glass beads to the inner casing surface, wherein at least the conditioned inner casing surface is essentially free of contaminants;
f) providing an alkali metal anode and a cathode comprising a halogen-containing material and assembling the anode and the cathode inside each casing as an electrochemical couple, wherein a first portion of the cathode is in electrochemical contact with the anode and a second portion of the cathode is in electrically conductive contact with at least a portion of the conditioned inner casing surface so that the casing serves as a cathode current collector;
g) providing at least one anode conductor supported by a glass-to-metal seal connected to a respective one of the casings, wherein the anode conductor is operatively connected to a respective anode, and wherein the at least one anode conductor is electrically isolated from the casing by the glass-to-metal seal; and
h) closing the casing opening to thereby seal the electrochemical couple inside the casing.

19. The method of claim 18 including providing the glass beads having a grain size ranging from about 40 µm to about 60 µm.

20. The method of claim 18 including applying the pressurized stream of glass beads impinging on the inner casing surface at a pressure greater than 0.0 MPa (0 psi) up to about 0.41 MPa (60 psi).

21. The method of claim 18 including providing at least one of:
i) the glass beads having a grain size ranging from about 35 µm to about 60 µm; and ii) the pressurized stream at a pressure greater than 0.0 MPa (0 psi) up to a maximum pressure of about 0.41 MPa (60 psi).

22. The method of claim 18 including applying the pressurized stream of glass beads impinging on the inner casing surface intended to be conditioned for about 2 seconds to about 10 seconds.

* * * * *

UNITED STATES PATENT AND TRADEMARK OFFICE
CERTIFICATE OF CORRECTION

PATENT NO.        : 9,293,741 B1
APPLICATION NO.   : 13/340217
DATED             : March 22, 2016
INVENTOR(S)       : Glenn J. Kraft et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 458 days.

In the Specification:

Column 7, line 3, delete "perchioric" and insert --perchloric--.

Column 7, line 21, Table 1, third column delete "100K" and insert --6.98K--.

Column 7, line 21, Table 1, fourth column delete "100K" and insert --6.98K--.

Column 8, line 3, Table 1-continued, third column delete "100K" and insert --6.98K--.

Column 8, line 3, Table 1-continued, fourth column delete "100K" and insert --6.98K--.

Column 8, line 35, delete "my" and insert --mV--.

Signed and Sealed this
Fourteenth Day of June, 2016

Michelle K. Lee
*Director of the United States Patent and Trademark Office*